US009652944B2

(12) United States Patent
Lee

(10) Patent No.: US 9,652,944 B2
(45) Date of Patent: May 16, 2017

(54) LOCALLY VIBRATING HAPTIC APPARATUS, METHOD FOR LOCALLY VIBRATING HAPTIC APPARATUS, HAPTIC DISPLAY APPARATUS AND VIBRATING PANEL USING THE SAME

(75) Inventor: Kapjin Lee, Seoul (KR)

(73) Assignees: LG INNOTEK CO., LTD, Seoul (KR); GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 500 days.

(21) Appl. No.: 13/338,830

(22) Filed: Dec. 28, 2011

(65) Prior Publication Data

US 2012/0162113 A1 Jun. 28, 2012

(30) Foreign Application Priority Data

Dec. 28, 2010 (KR) ........................ 10-2010-0136786
Dec. 28, 2010 (KR) ........................ 10-2010-0136787
Dec. 28, 2010 (KR) ........................ 10-2010-0137089

(51) Int. Cl.
*G06F 3/041* (2006.01)
*G08B 6/00* (2006.01)

(52) U.S. Cl.
CPC ...................................... *G08B 6/00* (2013.01)

(58) Field of Classification Search
CPC ........................................................ G08B 6/00
USPC ....................................... 345/173; 340/407.2
See application file for complete search history.

(56) References Cited

U.S. PATENT DOCUMENTS 6,429,846 B2 * 8/2002 Rosenberg et al. ........... 345/156
2006/0290662 A1 * 12/2006 Houston et al. .............. 345/156
2008/0122315 A1 * 5/2008 Maruyama et al. .......... 310/314
2008/0122797 A1 * 5/2008 Soh et al. ..................... 345/173
2009/0243997 A1 * 10/2009 Tierling et al. ............... 345/156
(Continued)

FOREIGN PATENT DOCUMENTS

JP 2008123453 A 5/2008
JP 2009211417 A 9/2009
KR 20080048837 A 6/2008

OTHER PUBLICATIONS (UCL. (2003). Acoustics of Speech and Hearing. phon.ucl.ac.uk. Retrieved Oct. 7, 2013, from http://www.phon.ucl.ac.uk/courses/spsci/acoustics/week1-4.pdf.).*
(Continued)

*Primary Examiner* — Kent Chang
*Assistant Examiner* — Andrew Lee
(74) *Attorney, Agent, or Firm* — Saliwanchik, Lloyd & Eisenschenk

(57) ABSTRACT

Disclosed is a locally vibrating haptic apparatus capable of vibrating a desired position of the haptic apparatus or adjusting a vibrating position by improving arrangement of vibrators and a frequency control method, the haptic apparatus including a panel and a vibrator transmitting vibration to the panel, wherein a vibration frequency outputted from the vibrator is adjusted in a domain less than a primary resonant frequency of the panel, thus controlling a vibrating position from a portion having the vibrator to a central portion of the panel, the haptic apparatus being advantageous in that the vibrating position of the panel may be precisely controlled by adjusting the frequency of the vibrator disposed on the edge of the haptic panel.

16 Claims, 12 Drawing Sheets

(56) References Cited

U.S. PATENT DOCUMENTS

| | | | | |
|---|---|---|---|---|
| 2010/0225600 | A1* | 9/2010 | Dai et al. | 345/173 |
| 2011/0006888 | A1* | 1/2011 | Bae et al. | 340/407.1 |
| 2011/0025479 | A1* | 2/2011 | Hwang et al. | 340/407.1 |
| 2011/0216027 | A1* | 9/2011 | Kim et al. | 345/173 |
| 2011/0248916 | A1* | 10/2011 | Griffin et al. | 345/157 |

OTHER PUBLICATIONS

Office Action dated Aug. 18, 2016 in Korean Application No. 1020100136787.

* cited by examiner

LOCALLY VIBRATING HAPTIC APPARATUS, METHOD FOR LOCALLY VIBRATING HAPTIC APPARATUS, HAPTIC DISPLAY APPARATUS AND VIBRATING PANEL USING THE SAME

CROSS-REFERENCE TO RELATED APPLICATIONS

This application claims the benefit under 35 U.S.C. §119 of Korean Patent Application Nos. 10-2010-0136786, filed Dec. 28, 2010, 10-2010-0136787, filed Dec. 28, 2010, and 10-2010-0137089, filed Dec. 28, 2010, which are hereby incorporated by reference in their entirety.

BACKGROUND

Field of the Invention

The present invention relates, in general, to a haptic apparatus and, more particularly, to a locally vibrating haptic apparatus and a method for locally vibrating the haptic apparatus, capable of vibrating a desired position of the haptic apparatus or adjusting a vibrating position by improving arrangement of vibrators and a frequency control method, and to a haptic display apparatus and a vibration panel having a plurality of excitation points, capable of isolating vibration from a housing to vibrate a desired position of a display part or adjust a vibrating position, vibrating a desired position of the display part or adjusting a vibrating position.

Description of Related Art

A display apparatus having a touch window is being widely spread as an improvement in sensitive manipulation of an interface is recently demanded. The touch window is a pointer input apparatus that is similar to a mouse, and is operated in conjunction with an image display apparatus such as a light emitting diode (LED) or a liquid crystal display (LCD).

The touch window is an apparatus that directly points a position by hand, or moves a pointer and inputs a desired instruction through a specific movement while being in contact with the touch window using an exclusive input tool such as stylus.

Such a touch window is configured to be intuitively used by stimulating a user sense, mainly, sight and hearing. Recently, an apparatus employing a haptic technology using a sense of touch is a growing trend.

The haptic technology is being widely applied to an apparatus having a display, such as a mobile apparatus, a monitor or a television.

Generally, a touch screen that is an LCD for forming an image and inputting a command through touch is provided on a front of the mobile apparatus. In order to execute a command displayed on the touch screen, a pointer is moved around the screen by a user manipulation. When the pointer reaches a desired menu or position, the command is executed by tapping at the desired menu or position with a finger.

In order to improve the sensitive manipulation of the touch screen, a vibrator is provided to generate vibration. The vibrator is generally received in a main body of the mobile apparatus to transmit vibration to the main body or to the window.

If a user inputs a command by touching a specific portion using a finger or a stylus, vibration is generated by the vibrator through which rated voltage flows, thus feeling vibration.

The vibrator may use a vibration motor or a linear actuator. Such a vibrator transmits vibration to the screen or the main body.

However, such a vibrator serves to simply transmit vibration. Thus, technical development for delicate and precise vibration control is required to achieve an original function of the haptic apparatus.

Further, a different magnitude of vibration may be frequently generated for each portion of the screen according to a location of the vibrator. The vibrator arranged as such may generate a larger magnitude of vibration in the main body than in the screen.

BRIEF SUMMARY

Accordingly, the present invention has been made keeping in mind the above problems occurring in the prior art, and an object of the present invention is to provide a locally vibrating haptic apparatus and a method for locally vibrating the haptic apparatus, capable of locally vibrating a panel and moving a vibrating position, by setting a frequency shape of a vibratile range to a desired portion of the haptic apparatus.

Another object of the present invention is to provide a haptic apparatus and a method for locally vibrating the haptic apparatus, capable of realizing local vibration, movement of a vibrating position, and removal of vibration from an undesirable portion, by improving types and arrangement of vibrators to locally vibrate a desired position throughout a whole area of the haptic apparatus.

A further object of the present invention is to provide a haptic display apparatus having a vibration isolating structure, capable of realizing local vibration of a display part and moving a vibrating position, by disposing vibrators on the haptic display apparatus to allow a desired portion of the apparatus or a vibration panel to be vibrated and suppressing transmission of vibration to portions other than a vibrating point.

Yet another object of the present invention is to provide a locally vibrating haptic display apparatus and a vibration panel, capable of realizing local vibration of a display part and moving a vibrating position, by disposing vibrators on the haptic display apparatus and connecting the vibrators at specific positions to allow a desired portion of the apparatus or the vibration panel to be vibrated, and selecting vibrators for precise frequency control.

In an aspect, there is provided a locally vibrating haptic apparatus, the apparatus comprising a panel, and a vibrator transmitting vibration to the panel, wherein a vibration frequency outputted from the vibrator is adjusted in a domain less than a primary resonant frequency of the panel, thus controlling a vibrating position from a portion having the vibrator to a central portion of the panel.

In another aspect, there is provided a method for locally vibrating a haptic apparatus, comprising (a) determining a primary resonant frequency of a panel, (b) connecting a vibrator to a lower surface of an edge of the panel, and (c) vibrating the vibrator with a frequency less than the primary resonant frequency, thus vibrating a specific position between a central portion of the panel and the edge.

In a further aspect, there is provided a haptic display apparatus having a vibration isolating structure, the apparatus comprising a display part, a housing supporting the display part at an upper position and defining an appearance, a support portion protruding towards an interior of the housing, and a piezoelectric beam vibrator taking a shape of a long rectangular plate, supported at an end by the support portion, and disposed such that an upper surface of the piezoelectric beam vibrator is spaced apart from a lower surface of the display part, a predetermined portion of the piezoelectric beam vibrator being connected to the lower surface of the display part.

In yet another aspect, there is provided a haptic display apparatus having a vibration isolating structure, the apparatus comprising a display part, a plurality of piezoelectric beam vibrators disposed under edges of the vibration display part, and a housing supporting ends of the piezoelectric beam vibrators, each of the piezoelectric beam vibrators being adjacent to an inner wall of the housing to be parallel to the inner wall, wherein each of the piezoelectric beam vibrators is spaced apart from the inner wall of the housing.

In another aspect, there is provided a haptic display apparatus having a plurality of excitation points, the apparatus comprising a housing, a display part defining an upper surface of the housing, forming an image, and receiving input through touch; and a plurality of piezoelectric beam vibrators, each of the piezoelectric beam vibrators taking a shape of a long rectangular plate and being connected at a predetermined portion thereof to a lower surface of each of edges of the display part.

In another aspect, there is provided a vibration panel, the vibration panel comprising a panel configured to input a command through touch and to sense vibration on an upper surface thereof; and a plurality of vibrators disposed under the panel to excite each center of edges of the vibration panel.

In another aspect, there is provided a vibration panel, the vibration panel comprising a panel configured to input a command through touch and to sense vibration on an upper surface thereof; and a plurality of vibrators disposed under the panel to excite corners of the vibration panel.

DETAILED DESCRIPTION

A locally vibrating haptic apparatus and a method for locally vibrating the haptic apparatus in accordance with a preferred embodiment of the present invention will be described in detail with reference to the accompanying drawings.

Figure 1:
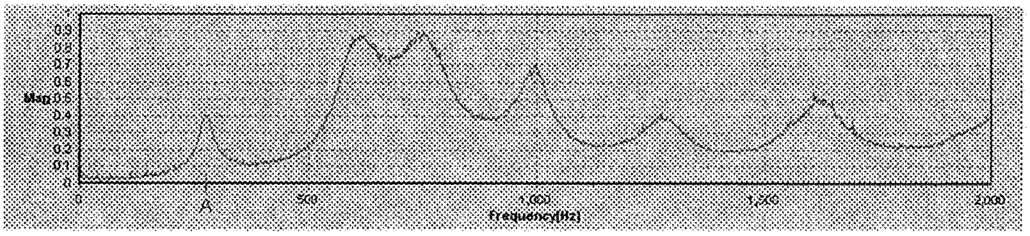
FIG. 1 is a graph showing a natural frequency of a panel of a haptic apparatus in accordance with an embodiment of the present invention.

FIG. 1 is a graph showing a natural frequency of a panel disposed on a haptic apparatus in accordance with the present invention.

In the present invention, the haptic apparatus includes a panel that transmits vibration feedback or outputs vibration through touch. Hereinafter, the panel of the haptic apparatus according to the present invention may be applied to various display types of touch screens or a simple display panel, as long as the panel is a panel to which a vibration type of haptic technology is applied. Further, it is noted that the present invention may be applied to various types of panels which transmit tactility by vibration according to the haptic technology, even if the panels do not form images. Further, the panel generally comprises a flat plate, but may have various shapes such as a curved surface or a three-dimensional shape according to an entire shape of the haptic apparatus.

The panel of the haptic apparatus is shaped like a flat plate in appearance. Since the panel is manufactured using various materials and parts, the panel generally has a plurality of resonant frequencies.

Therefore, as shown in FIG. 1, the panel of the haptic apparatus has resonant frequencies in several frequency domains Herein, among resonant frequencies formed in several frequency domains, a resonant frequency in the lowest frequency domain is defined as a primary resonant frequency A. In the graph of FIG. 1, a horizontal axis means a frequency and a vertical axis means a magnitude.

In the graph, a section in which amplitude is rapidly increased depending on a variation in frequency, that is, a section where resonance occurs means a resonant frequency. In the drawing, the primary resonant frequency A is generated in about 257 Hz.

The resonant frequency shown in FIG. 1 is an example for the selected haptic apparatus. The primary resonant frequency of another range may be generated according to the material, arrangement and mass of the haptic apparatus.

Further, when the panel of the haptic apparatus is assembled with a casing, a bracket or a peripheral device, it is noted that the frequency may mean a resonant frequency of the panel itself or a resonant frequency of an entire system formed by assembly of the panel with the above members.

Figure 2:
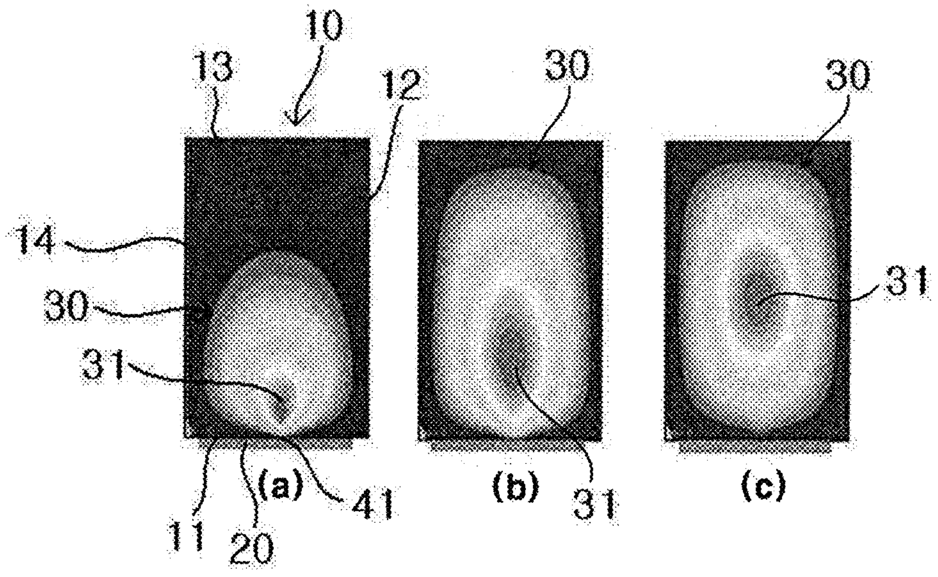
FIGS. 2*a* to 2*c* are views schematically showing movement of a vibrating region of a locally vibrating haptic apparatus in accordance with the present invention.

According to the concept of the present invention, the primary resonant frequency is important to the local vibration of the haptic apparatus. Such a concept will be described in detail with reference to FIGS. 2*a* to 2*c*.

FIGS. 2*a* to 2*c* are schematic views showing movement of a vibrating range according to the frequency of the haptic apparatus of the present invention.

The panel 10 of the haptic apparatus is approximately shaped like a rectangular plate. FIGS. 2*a* to 2*c* are top views showing the movement of the vibrating range. Hereinafter, as shown in the drawings, a lower edge on which a vibrator 20 is disposed is defined as a first edge 11. When moving counterclockwise from the first edge 11, edges emerging sequentially are defined as a second edge 12, a third edge 13 and a fourth edge 14. Of course, the panel 10 of the haptic apparatus may have various shapes such as a circular shape or a polygonal shape.

According to the concept of the present invention, an excitation frequency outputted from the vibrator 20 is adjusted in a domain less than the primary resonant frequency.

The reason why the primary resonant frequency is important is as follows. That is, when the resonant frequency is set in a domain more than the primary resonant frequency, the excitation frequency outputted from the vibrator 20 is adjusted in a domain less than the preset resonant frequency. Thus, if the resonant frequency is generated in the domain less than the preset resonant frequency, a vibrating position reaches a central portion of the panel in the domain less than the preset resonant frequency, so that it is unsuitable for controlling the vibrating position.

To be more specific, as shown in FIG. 2*a*, when the excitation frequency is relatively lower than the primary resonant frequency, a vibration center 31 having the largest vibration on an upper surface of the panel 10 of the haptic apparatus is adjacent to a vibrating point 41.

FIG. 2*b* shows the vibration center 31 and a vibrating region 30 when the excitation frequency is increased as compared to the case of FIG. 2*a*. It can be seen that the vibration center 31 moves from the first edge 11 towards a central portion of the panel 10 of the haptic apparatus.

FIG. 2*c* shows vibration when the excitation frequency is identical with the primary resonant frequency. The vibration center 31 corresponds to the central portion of the panel 10 of the haptic apparatus.

That is, when the frequency is low, the vibration center 31 on the panel 10 of the haptic apparatus is formed to be adjacent to the vibrating point 41. As the frequency increases, the vibration center 31 moves towards the center of the panel 10 of the haptic apparatus. When the frequency is equal to the primary resonant frequency, the vibration center 31 is formed at the center of the panel 10.

Thus, the excitation frequency of the vibrator 20 is adjusted in the domain less than the primary resonant frequency of the panel 10 of the haptic apparatus, so that the vibrating region moves from the edge to the center of the panel 10 of the haptic apparatus, thus controlling a vibrating position.

Figure 3:
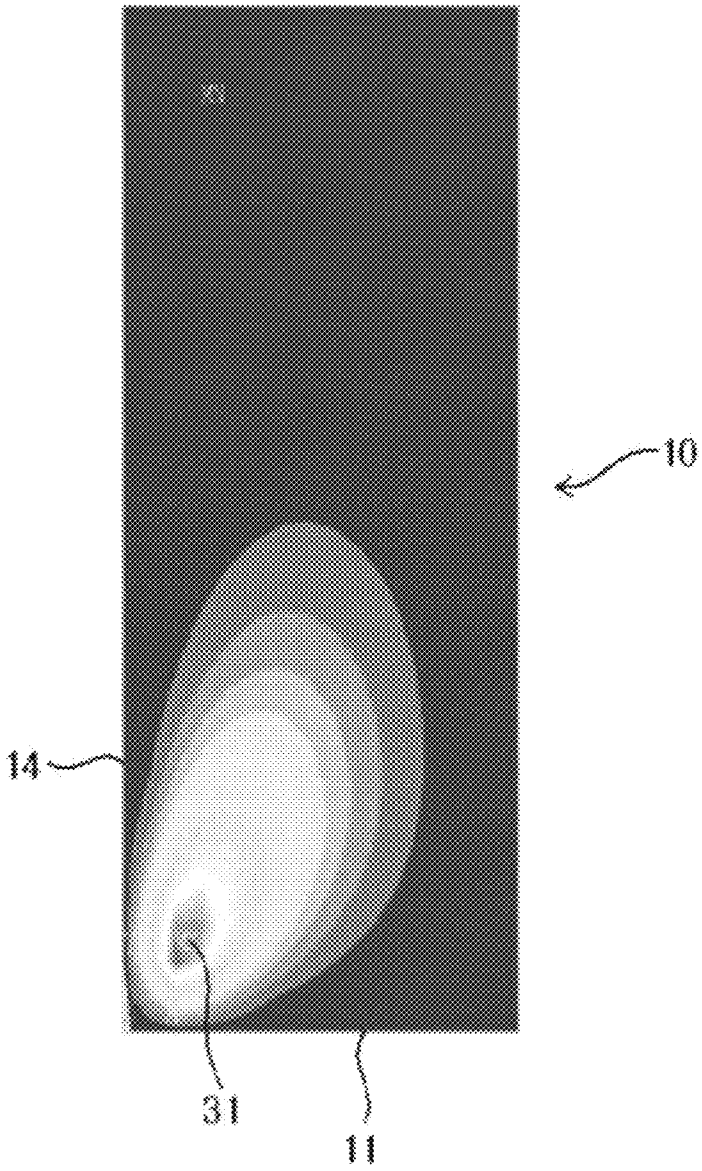
FIG. 3 is a view schematically showing a vibrating region when a vibrator is disposed on a corner of a panel of the locally vibrating haptic apparatus in accordance with the present invention.

Further, FIG. 3 is a schematic view showing vibration when the vibrating point is formed at a corner.

In FIG. 3, the vibrating point is formed at a corner between the first edge 11 and the fourth edge 14. When the excitation frequency is low, the vibration center 31 is formed to be adjacent to the corner of the panel 10 of the haptic apparatus. As the frequency increases, the vibration center moves towards the center of the panel 10 of the haptic apparatus.

Figure 4:
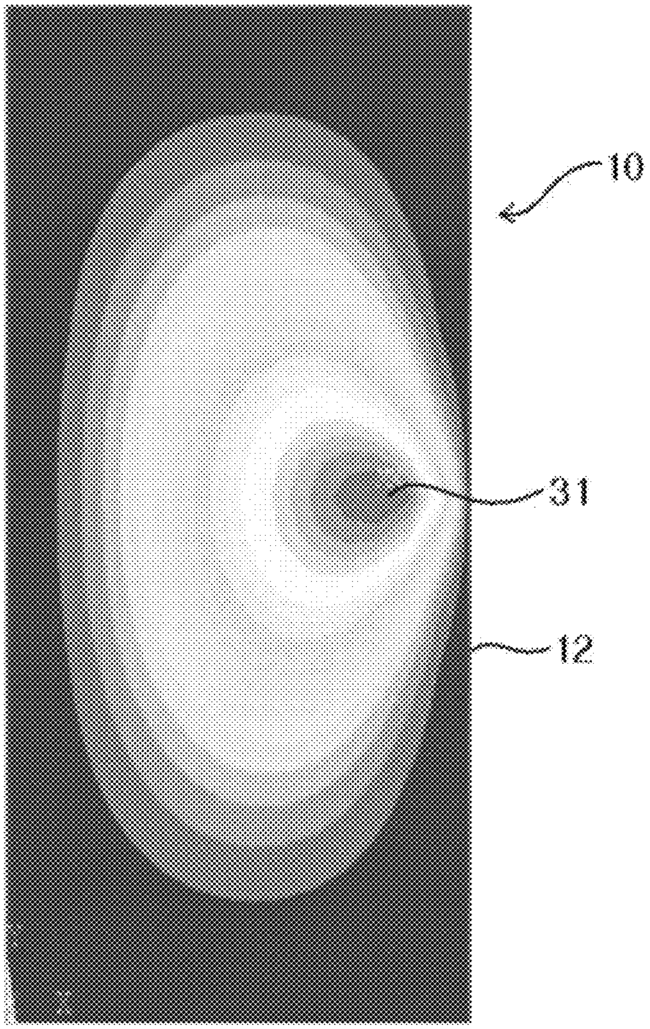
FIG. 4 is a view schematically showing a vibrating region when the vibrator is disposed on an edge of the panel of the locally vibrating haptic apparatus in accordance with the present invention.

FIG. 4 is a schematic view showing vibration when the vibrating point is formed at a vertical edge.

In FIG. 4, the vibrating point is situated at a center of the second edge 12. In this case, the vibration center 31 is formed to be adjacent to the second edge 12 when the excitation frequency is low.

As the frequency increases, the vibration center moves towards the center of the panel 10 of the haptic apparatus.

Figure 5:
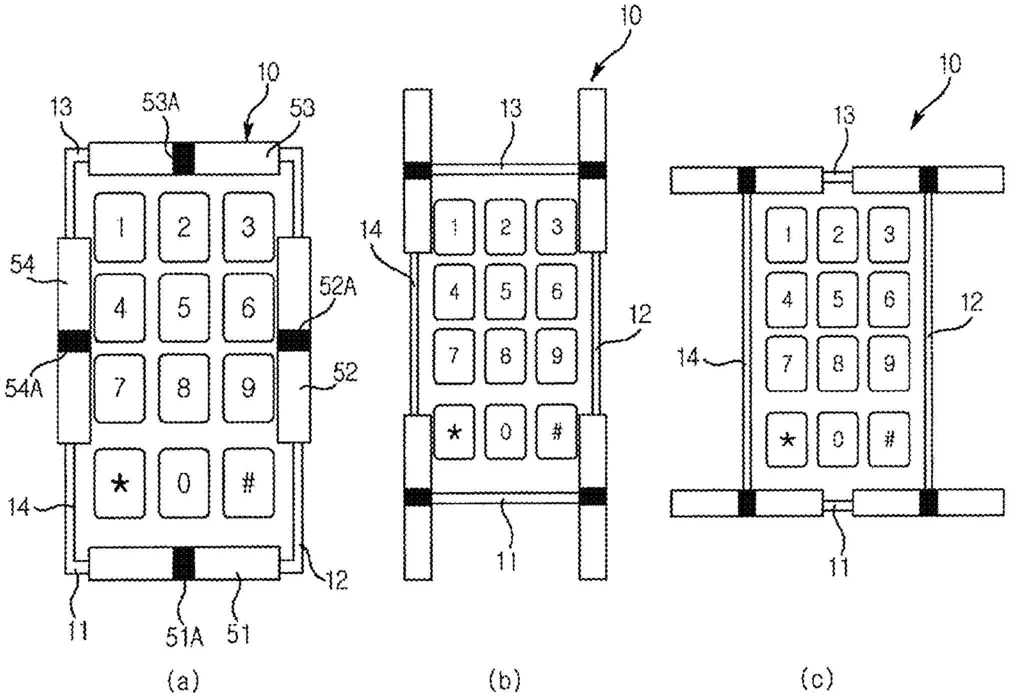
FIGS. 5*a* to 5*c* are plan views showing examples of locations of vibrators of the locally vibrating haptic apparatus in accordance with the present invention.

FIGS. 5*a* to 5*c* are plan views showing arrangement of vibrators of the locally vibrating haptic apparatus according to the present invention.

FIG. 5*a* shows the arrangement of the vibrators when vibrating points are formed at centers of the respective edges, and FIGS. 5*b* and 5*c* show examples of the arrangement of the vibrators when the vibrating points are formed on corners.

According to the present invention, three or more vibrators are disposed to generate vibration at specific positions of the panel 10 of the haptic apparatus. Thus, it is possible to generate vibration at a desired position or move the vibrating position by using vibration from each vibrator.

Preferably, when four vibrators are arranged and the panel 10 of the haptic apparatus takes a rectangular shape, the vibrating point that is the vibration center of each vibrator may be formed on each edge or comer.

As long as the vibrator may form the vibrating point on a specific portion, the vibrator may be selected from various vibrators including a vibration motor and a linear actuator. However, it is preferable to use a piezoelectric element type of vibrator because it may precisely control vibration.

The piezoelectric element type of vibrator is configured to obtain vibration using piezoelectric or magnetic torsion effect. The vibrator according to the present invention uses a vibration beam type of piezoelectric (PZT) beam vibrator that is supported at an end thereof by the piezoelectric element to perform excitation.

Such a vibration beam type of vibrator may use a one-end support method. More preferably, the vibrator uses a both-end support type of Bimorph PZT vibrator to maximize vibration efficiency and realize precise vibration control.

Further, the vibrating point of the Bimorph PZT vibrator is formed at the center of the vibrator because the largest displacement occurs in a central portion of the vibration beam. More precisely, the panel 10 of the haptic apparatus and the central portion of the Bimorph PZT vibrator are connected to each other to transmit vibration, and a connection point becomes the above-mentioned vibrating point. FIG. 5*a* shows an example wherein the vibrators are disposed on the edges. Here, the vibrating point of the Bimorph PZT vibrator is formed at the center of each edge.

The vibrators 51, 52, 53 and 54 are provided on the respective edges 11. 12, 13 and 14. More precisely, each vibrator is arranged such that the vibration beam is parallel to each edge, and is connected at the center thereof to the panel 10 of the haptic apparatus, thus forming the vibrating point 51A. 52A, 53A and 54.

Meanwhile, FIGS. 5*b* and 5*c* are views showing vibrating points formed on the corners. As shown in FIGS. 5*a* to 5*c*, when four vibrating points are formed on centers of the respective edges or on the respective corners, it is possible to control local vibration at a specific position of the panel 10 of the haptic apparatus.

When the vibrator comprises a linear actuator, a vibration motor or a one-end support type of piezoelectric actuator, it may be applied to the above-mentioned two cases. However, in the case of using the bimorph PZT vibrator, it is difficult to arrange the vibrators as shown in FIGS. 5*b* and 5*c*. Especially in the case of requiring miniaturization as in a mobile apparatus, it is difficult to apply the bimorph PZT vibrator to each corner of the haptic apparatus for transmitting vibration.

Preferably, the bimorph PZT vibrator is arranged to be parallel to each edge of the haptic apparatus, and is connected at a center thereof to the haptic apparatus, thus forming the vibrating point at the center of each edge.

Of course, the bimorph PZT vibrator may also be disposed on each corner.

A method for controlling vibration portions according to the arrangement of the above-mentioned haptic apparatus and vibrators will be described later.

Meanwhile, it is necessary to consider a waveform of a vibration frequency transmitted by the vibrator so as to precisely control the vibration portions using the primary resonant frequency of the haptic apparatus. Hereinafter, an output frequency based on a frequency of voltage applied to the piezoelectric element will be described.

Figure 6:
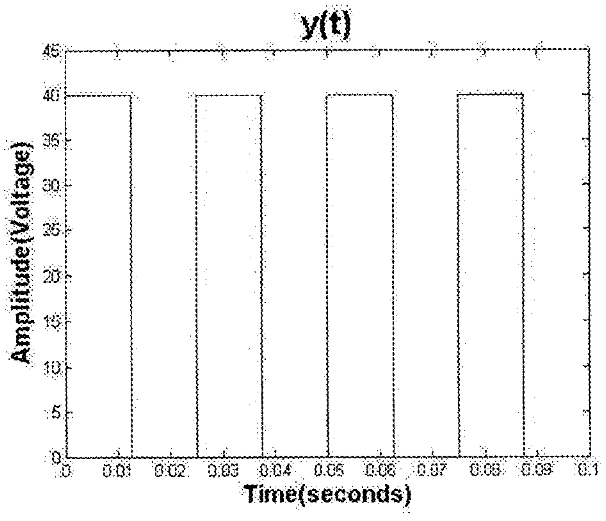
FIG. 6 is a graph showing a case where a square input waveform is in a time domain.
Figure 7:
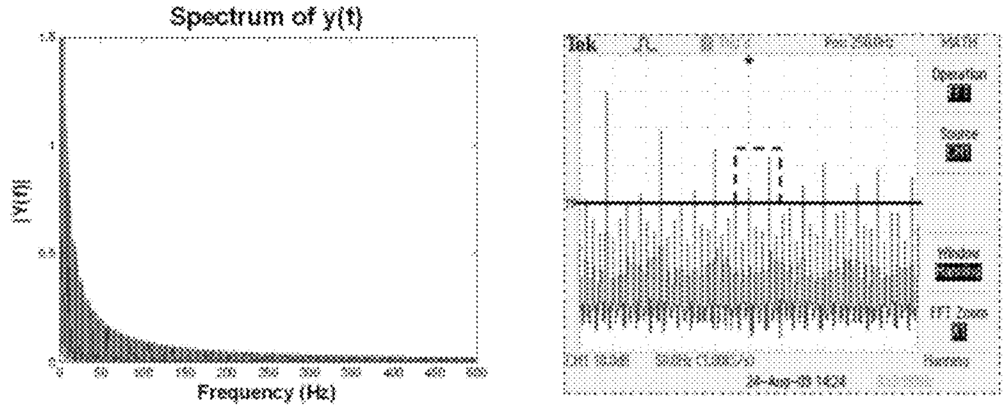
FIG. 7 is a graph showing a case where a square input waveform is in a frequency domain, through a spectrum analysis.
Figure 8:
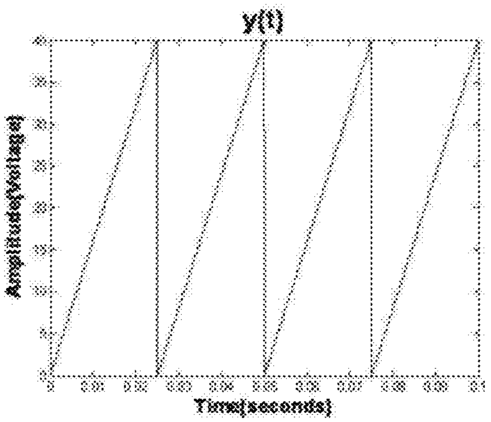
FIG. 8 is a graph showing a case where a perfectly asymmetric input waveform is in a time domain.
Figure 9:
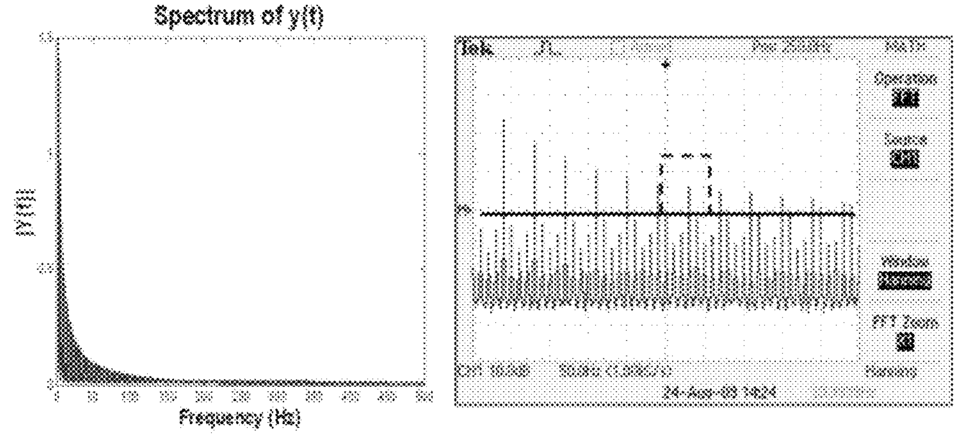
FIG. 9 is a graph showing a case where a perfectly asymmetric triangle input waveform is in a frequency domain, through a spectrum analysis.
Figure 10:
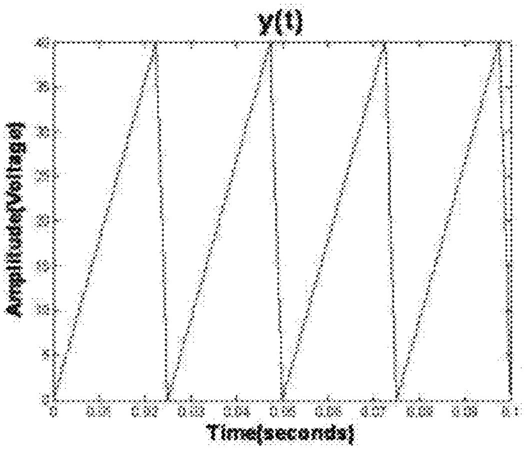
FIG. 10 is a graph showing a case where an asymmetric triangle input waveform is in a time domain.
Figure 11:
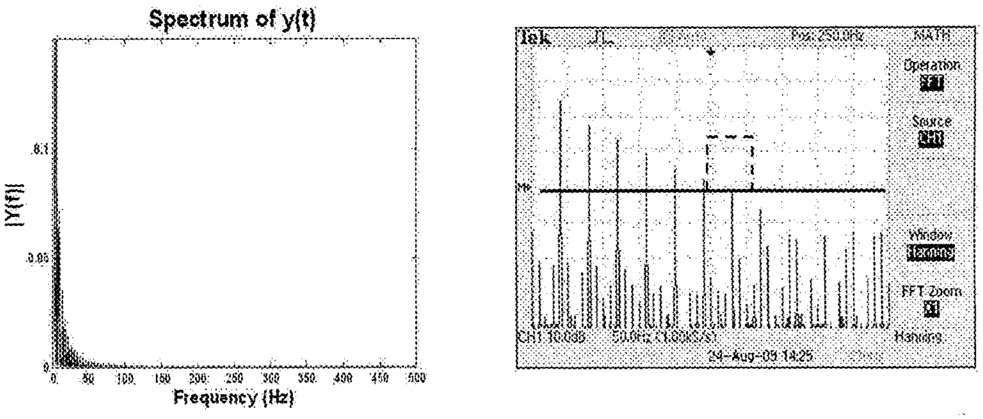
FIG. 11 is a graph showing a case where an asymmetric triangle input waveform is in a frequency domain, through a spectrum analysis.

FIGS. 6 and 7 show a square wave, FIGS. 8 and 9 show a triangle wave whose symmetry ratio is 1:0, and FIGS. 10 and 11 show a triangle wave whose symmetry ratio is 9:1.

In FIGS. 6, 8, and 10, a horizontal axis represents a time axis of a second scale, while a vertical axis represents an amplitude axis of a scale of applied input voltage.

Further, FIGS. 7, 9 and 11 are spectrum analysis graphs when y=f(t), that is, a function of voltage for time is converted into a function of magnitude for frequency, |Y(f)|. In each drawing, a right-hand side view shows a spectrum result obtained by an oscilloscope.

FIG. 6 shows the square wave. In the spectrum shown as the function for the frequency, a frequency corresponding to a 257 Hz component is shown. This is clearly shown in a dotted line area of the right-hand side view of FIG. 8.

Thus, in the case of using the square wave as the frequency of voltage applied to the vibrator, the haptic apparatus may vibrate. However, the vibration frequency of the vibrating point includes a primary resonant frequency mode, so that there is no difference in vibration between the vibrating point and a desired vibration center, and thereby it is impossible to achieve the local vibration.

Further, FIG. shows a triangle wave, and particularly a triangle wave having the symmetry ratio of 1:0, namely, the asymmetry of 100%. In the dotted line area of FIG. 9 showing the spectrum analysis result of the complete asymmetric triangle wave, the frequency component of 257Hz is generated, and the vibration frequency of the vibrating point includes the primary resonant frequency mode similarly to the square wave, and thereby it is impossible to achieve the local vibration.

Meanwhile, FIG. 10 shows the triangle wave, and particularly shows a case where the symmetry ratio is 9:1. In this case, when checking the spectrum analysis result as illustrated in FIG, 11, the frequency component of 257Hz is not generated, so that it is possible to achieve desired local vibration.

Therefore, according to the concept of the present invention, it is preferable that the input wave for controlling vibration of the locally vibrating haptic apparatus be the triangle wave.

As described above, the primary resonant frequency is an example for a selected haptic apparatus. The primary resonant frequency of a different range may be generated depending on a material, arrangement and mass of the haptic apparatus or the panel of the haptic apparatus. In this case, the symmetry ratio of the triangle wave must be corrected.

That is, the symmetry ratio of the wave of the input voltage frequency applied to the vibrator may be selected from a form that prevents the component of the primary resonant frequency domain of the haptic apparatus or a display system from being generated during the spectrum analysis.

When the spectrum is analyzed in the frequency having a specific wave, if the wave has a large magnitude in a frequency lower than the primary resonant frequency domain and has a relatively smaller magnitude in a component of the primary resonant frequency domain, the frequency of such a wave may be used as an input wave.

Further, if there is no component of the primary resonant frequency domain, a frequency having a wave different from the triangle wave may be naturally selected.

FIGS. 12 to 15 are plan views showing various examples of controlling the vibrating position of the haptic apparatus according to the present invention.

Figure 12:
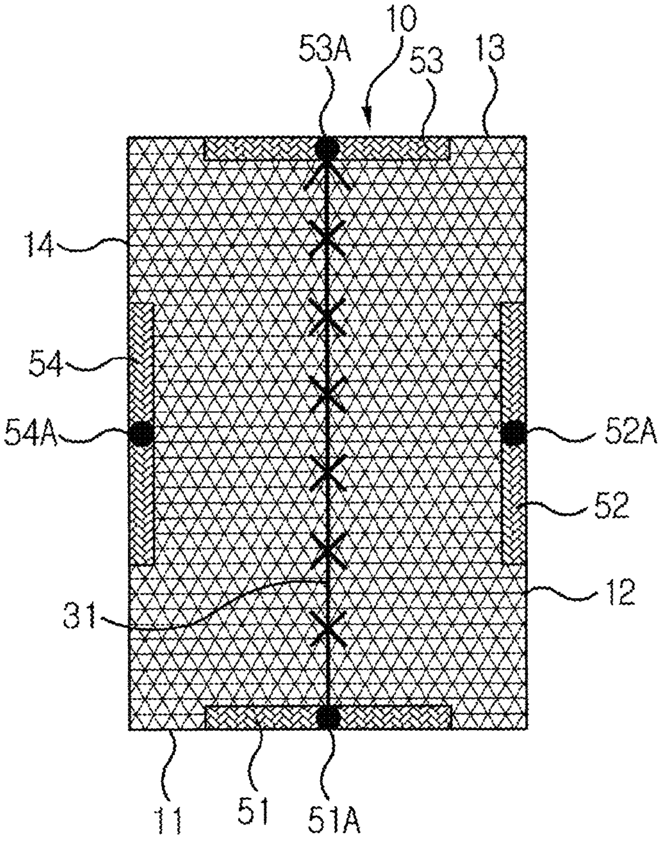
FIG. 12 is a plan view showing movement of a vibrating position in a vertical direction from bottom to top of the locally vibrating haptic apparatus in accordance with the present invention.

FIG. 12 is a plan view showing a movement of the vibration center in a direction from the first edge to the third edge.

As described above, the panel 10 of the haptic apparatus is provided with the first edge 11, the second edge 12, the third edge 13 and the fourth edge 14 that are sequentially placed counterclockwise from a lower position. The vibrators are disposed to be parallel to the respective edges. Further, the vibrators 51, 52, 53 and 54 are connected at centers thereof to the edges to form vibrators points 51A, 52A, 53A, and 54A.

Here, portion denoted by 'X' represents the vibration center 31, namely, a desired vibrating position, and an arrow represents a moving course of the vibration center 31.

A process of moving the vibration center from the first edge 11 to the third edge 13 is as follows. If the first vibrator 51 transmits vibration while gradually increasing a frequency from a domain less than the primary resonant frequency of the panel 10 of the haptic apparatus, the vibration center 31 formed adjacent to the first edge 11 moves gradually to the center of the panel 10 of the haptic apparatus.

If the excitation frequency of the first vibrator 51 is equal to the primary resonant frequency, the vibration center 31 is located at the center of the panel 10. At this time, if voltage applied to the first vibrator 51 is cut off and the frequency of voltage applied to the third vibrator 53 is gradually reduced from the primary resonant frequency, the vibration center 31 formed at the center of the panel 10 is gradually moved to the third edge 13.

Figure 13:
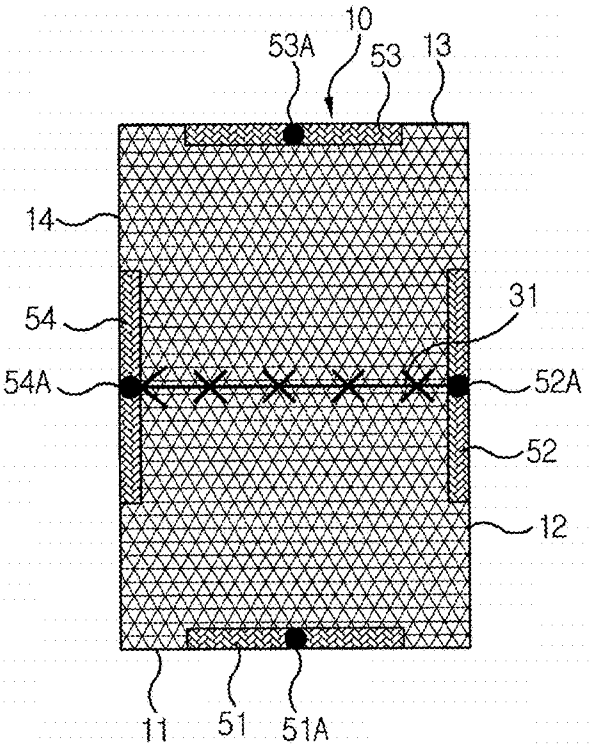
FIG. 13 is a plan view showing movement of a vibrating position in a horizontal direction from left to right of the locally vibrating haptic apparatus in accordance with the present invention.

Since a method for moving the vibration center 31 from the third edge 13 to the first edge 11 is performed in reverse order, a detailed description thereof will be omitted herein. Further, FIG. 13 is a plan view showing a vibration center that moves between the second edge and the fourth edge.

Similarly to the example of FIG. 12, if the excitation frequencies of the second vibrator 52 and the fourth vibrator 54 are adjusted in a domain below the primary resonant frequency, the vibration center may horizontally move between the second edge 12 and the fourth edge 14.

Figure 14:
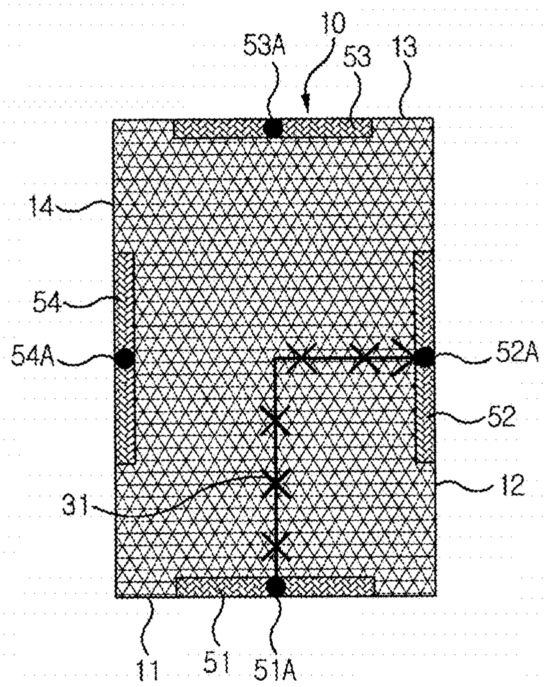
FIG. 14 is a plan view showing movement of a vibrating position in upward and horizontal directions of the locally vibrating haptic apparatus in accordance with the present invention.

Further, FIG. 14 is a plan view showing the vibration center moving between the first edge and the second edge.

The process of moving the vibration center 31 from the first edge 11 to the center of the panel 10 of the haptic apparatus is equal to the example of FIG. 12. However, when the vibration center 31 reaches the center of the panel 10, the vibrating position may be moved towards the second edge 12 by gradually lowering the excitation frequency of the second vibrator 52 from the primary resonant frequency.

The vibration course moved by the above process approximately has an 'L' shape or an inverted 'L' shape.

Figure 15:
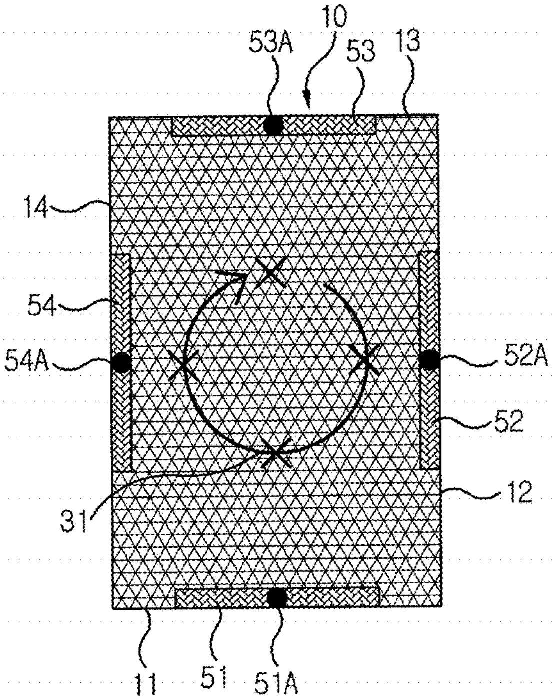
FIG. 15 is a plan view showing movement of a vibrating position in a circular shape on the locally vibrating haptic apparatus in accordance with the present invention.

FIG. 15 is a plan view showing a movement of the vibration center in a circular shape.

In order to form the vibration center 31 at a position spaced apart from the center of the panel 10 of the haptic apparatus to be adjacent to the third edge 13, a predetermined frequency of voltage is applied to the third vibrator 53. After a lapse of a predetermined time, the same voltage is applied to the second vibrator 52. If the vibrating position is moved to generate vibration sequentially from the first vibrator 51 to the fourth vibrator 54, the vibration center 31 moves clockwise at a predetermined interval of time.

When the above vibrating positions are connected to each other, they form a rectangular shape. However, if the vibration center 31 is moved as such, the rotation of the vibrating position may be recognized through touch.

Hereinbefore, the case where the desired position is vibrated by one vibrator or the vibrating position is sequentially moved has been described. However, there is proposed a method for reinforcing or cancelling vibration using interference of vibration generated by two or more vibrators.

Turning back to FIG. 2, a predetermined vibration center 31 is formed by the vibrator, but the vibrating region 30 is generated around the vibration center 31. The vibrating region 30 has a smaller displacement as compared to the vibration center 31. However, in order to precisely control the vibrating position, it is necessary to remove vibration from ranges other than the vibration center 31.

Therefore, any one of the vibrators may vibrate the panel, while at least one of the remaining vibrators may cancel and remove vibration from portions other than a specific portion of the panel. Such a cancelling operation may be realized by generating vibration in a region where frequencies having opposite phases and the same magnitude face each other.

Further, vibration can be maximized by simultaneously vibrating two or more vibrators and increasing a wavelength by interference. According to such a concept, vibration is reinforced at an intersection of the vibrating regions 30 formed by two vibrators, thus further increasing vibration, and generating vibration that may be sensed along a specific line or region instead of a specific point.

As described above, if the vibrating point is formed on each edge of the panel of the haptic apparatus and an excitation frequency is adjusted in a domain below the primary resonant frequency, vibration can be generated at a desired position of the haptic apparatus, the vibrating position can be adjusted, and multiple vibrations can be generated at two or more portions.

Therefore, unlike the prior art, the locally vibrating haptic apparatus according to the present invention can generate or move vibration at or to a desired position throughout most of the region of the panel, thus maximizing a user's convenience and effectively generating various outputs.

According to the embodiment of the present invention, the vibrators are disposed such that the vibrating position is set at the center of each edge. However, in order to more precisely control the vibrating position, two or more vibrators may be provided on each edge. Of course, the vibrating point may be formed at a position adjacent to a central portion in place of the edge.

Meanwhile, the method for locally vibrating the haptic apparatus according to the present invention will be described based on the above description. The method may include a step of determining the primary resonant frequency of the panel of the haptic apparatus, a step of connecting a vibrator to a center of each edge of a lower surface of the panel, and a step of vibrating a specific position between a central portion and the edge of the panel by exciting the vibrator with a frequency below the primary resonant frequency. Thus, as the excitation frequency increases, the vibrating position may move from the edge to the central portion of the panel. As described above, as the excitation frequency is changed at a predetermined interval of time, the vibrating position is moved.

Preferably, at the vibrator connecting step, the vibrator is connected to each edge, and any two vibrators selected from a plurality of vibrators are vibrated, thus vibrating a specific position of the panel.

In this case, multiple vibrations may be performed by the plurality of vibrators, thus allowing vibration to be generated only in a specific line or region. Thus, if different vibrators are vibrated at a predetermined time interval, the vibrating position may be moved, and besides the vibrating position may be moved in a desired shape throughout a whole area of the haptic apparatus.

Further, at the vibrator connecting step, the vibrator is connected to each edge. At the specific position vibrating step, any one of the vibrators vibrates the panel, and at least one of the remaining vibrators cancels vibration of portions other than the specific position of the panel.

To be more specific, referring to FIGS. 2*a* to 2*c*, vibration generated between the first edge 11 and the central portion of the panel by the first vibrator 51 may vibrate the whole vibrating region 30 as well as the vibration center 31. When vibration of a peak value sensed only at the vibration center 31 is generated, vibration generated in regions other than the vibration center 31 may be ignored. Otherwise, it is necessary to remove undesirable vibration. By exciting vibrators other than the first vibrator 51, the vibration can be removed. In this case, the frequency of the remaining vibrators may be equal in magnitude to and be opposite in phase to that of the first vibrator 51.

The above-mentioned specific position vibrating step further includes a step of inputting voltage applied to the vibrator in a frequency of a triangle wave, thus removing a frequency having a primary resonant frequency component and thereby enabling precise vibration.

According to the present invention, the rectangular haptic apparatus has been described as an example. However, as described above, the haptic apparatus may have various shapes as necessary, and the vibrating position may be controlled by arranging the vibrators at proper positions, changing the frequency of the individual vibrator and using interaction. Further, it should be understood that panels providing only tactility without displaying images as well as panels displaying various kinds of images fall within the purview of the present invention.

Hereinafter, the haptic display apparatus will be described in detail with reference to FIGS. 17 to 22.

The haptic display apparatus according to the present invention includes a display part that transmits vibration feedback or outputs vibration through touch. Hereinafter, the haptic display part according to the present invention may also be applied to various display types of touch feedback screens or display parts having a simple display function, as long as they are films or display parts to which haptic technology using vibration is applied. Further, the preferred embodiment of the present invention is described using a screen or a display part. However, it should be understood that the invention includes a vibration panel transmitting tactility by vibration according to the haptic technology even if the panel do not form an image. Further, the display part or panel generally takes a shape of a flat plate. However, the display part or panel may generally have various shapes such as a curved shape or a three-dimensional shape, according to an entire shape of the apparatus.

According to the present invention, the vibrator is disposed on the lower surface of the edge or corner of the display part to be connected to the display part. If the vibrating point may be formed on a specific portion of the display, the vibrator may be selected from various vibrators such as a vibration motor or a linear actuator. However, it is preferable to use a piezoelectric type vibrator because it can precisely control vibration.

Figure 17:
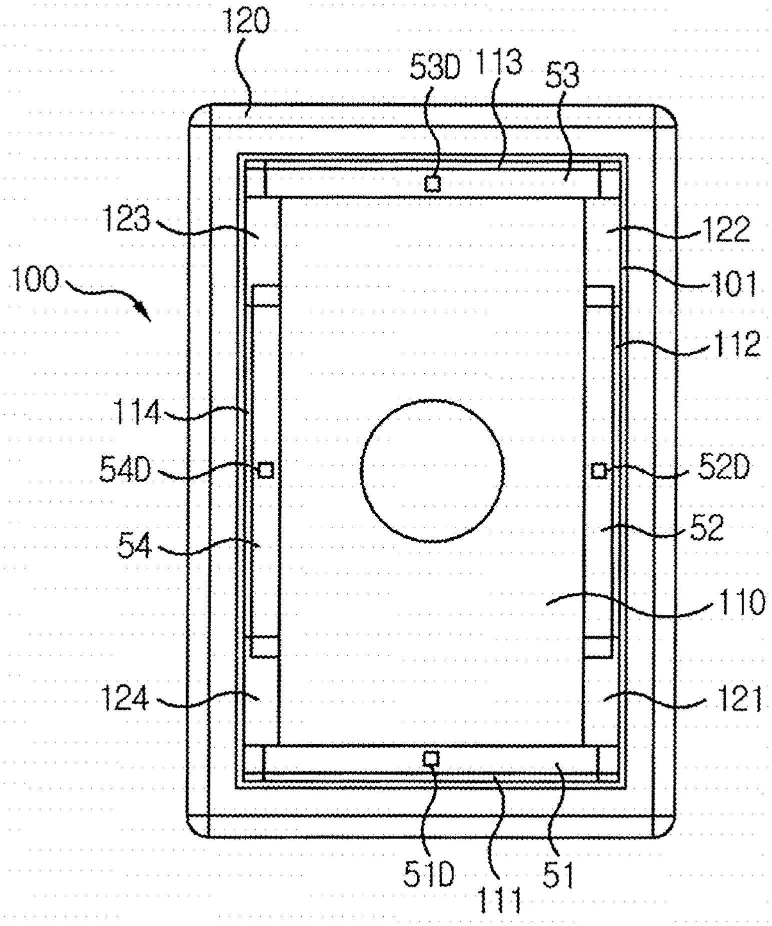
FIG. 17 is a plan view showing a haptic display apparatus having the piezoelectric beam vibrators.
Figure 18:
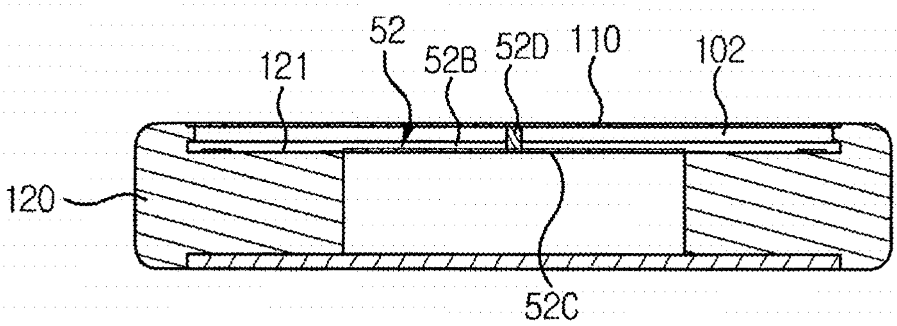
FIG. 18 is a side sectional view showing a second vibrator disposed on the haptic display apparatus of FIG. 17.

Such a piezoelectric type vibrator will be described in detail with reference to FIG. 17. FIG. 17 is a side sectional view showing an example of a piezoelectric (PZT) beam vibrator that is to be disposed on a display apparatus according to the present invention, and FIG. 18 is a plan view showing a haptic display apparatus on which the PZT beam vibrator is disposed.

The piezoelectric type vibrator is operated to vibrate a vibrating portion using piezoelectric or magnetic torsion effect. The vibrator according to the present invention uses the PZT beam vibrator that is supported at an end thereof to a piezoelectric element to transmit vibration.

The PZT beam vibrator 51 includes a beam 51B and a piezoelectric actuator 51C. The beam 51B taking a shape of a long rectangular plate amplifies and transmits vibration by elastic force. The piezoelectric actuator 51C is connected to the beam 51B, and is contracted or expanded by applied voltage to transmit vibration.

When an electric field is applied to the piezoelectric actuator 51C, it is contracted or expanded in a horizontal direction and is coupled to the beam 51B by bonding. The beam 51B generates a vertical movement amplified by the piezoelectric actuator 51C.

If the piezoelectric actuator 51*c* is driven by a square wave, an acceleration curve and a sense similar to those of clicking are generated. Meanwhile, if the piezoelectric actuator 51C is driven by a sine wave, a displacement may be generated within a comfort zone when the actuator transmits vibration to the hand. As such, a waveform of a frequency applied to the vibrator will be described later.

The piezoelectric actuator is advantageous in that voltage applied to the piezoelectric actuator may act with various frequencies and input waveforms and a broadband haptic response is possible. Further, since power consumption of the piezoelectric actuator is smaller than that of a general vibrator and a response speed of the actuator is fast, the piezoelectric actuator may promptly provide feedback for a user input to the haptic apparatus.

Figure 16:
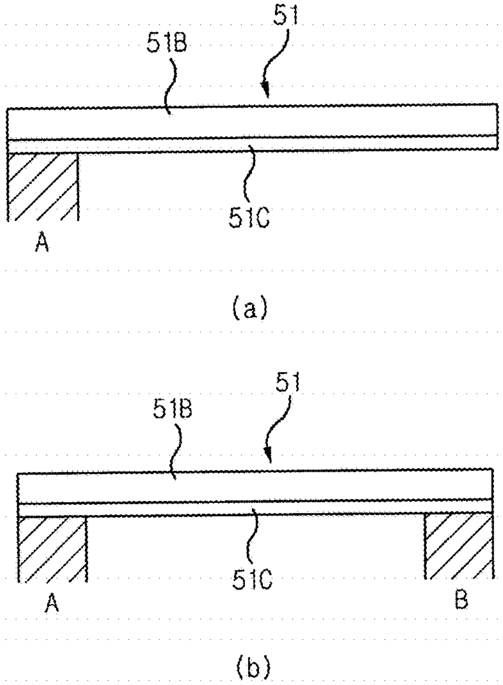
FIGS. 16*a* and 16*b* are side sectional views showing examples of piezoelectric beam vibrators that may be disposed on a display apparatus in accordance with the present invention.

FIG. 16*a* shows a PZT beam vibrator configured so that one end of the beam is supported and the other end is freely vibrated in a vertical direction, and FIG. 16*b* shows a PZT beam vibrator configured so that both ends thereof are supported and a portion therebetween is vibrated in a vertical direction.

Both of the PZT beam vibrators shown in FIGS. 16*a* and 16*b* may be applied to the haptic display apparatus of the present invention. Since the one-end support type of PZT beam vibrator has maximum vertical displacement at the other end, the other end is connected to the edge of the display part More precisely, an upper surface of the other end is connected to the lower surface of the edge of the display via a predetermined connection member, thus transmitting vertical vibration and forming the vibrating point.

Meanwhile, in the case of the both-end support type of PZT beam vibrator of FIG. 16*b*, its central portion has maximum displacement, so that the central portion of the beam 51B is connected to the display part, thus forming the vibrating point.

When the beam 51B is bonded to the piezoelectric actuator 51 and finally vertical vibration is generated by the electric field, it is preferable to use the both-end support type of PZT beam vibrator, which is easy to control vibration of the central portion and is superior in durability and operational reliability.

Further, the both-end support type of PZT beam vibrator must be supported at both ends thereof to a support part of the display apparatus, such as a housing or a bracket. When the vibrating point is formed at the central portion, a space larger than the display part is required to dispose the vibrator on the corner.

Such a spatial problem may become more serious when the vibrator is applied to a mobile apparatus requiring miniaturization and lightness.

Therefore, according to the present invention, in the case of applying the both-end support type of PZT beam vibrator, it is preferable that the vibrator be connected to the center of the edge of the display part to form the vibrating point.

The haptic display apparatus having the both-end support type of PZT beam vibrator will be described in detail with reference to FIG. 17.

The haptic display apparatus according to the present invention is provided with the display part 110 into which a command is inputted through a finger touch or which senses vibration.

Hereinafter, the display part 110 will be described with a shape of a rectangular flat plate. In the plan view of FIG. 17, a front edge is defined as a first edge 111. When moving counterclockwise from the first edge 11, edges emerging sequentially are designated as a second edge 112, a third edge 113 and a fourth edge 114. The edges designated as such mean edges of the display part 110. Further, in the embodiment of the present invention, the display part takes a shape of a rectangular plane. Hereinafter, a long side of the plane is defined as a vertical length, and a short side is defined as a lateral length.

Of course, the display part 110 may have a shape of a square, polygon or curve.

The embodiment of the present invention proposes a concept of adjusting vibrating positions on the upper surface of the display part by a plurality of vibrating points when a plurality of vibrators disposed on the edges of the display part is operated. Preferably, three or more vibrating points are disposed on the edges of the display part. More preferably, when the display takes a rectangular shape, four vibrating points are disposed on centers of respective edges or corners.

Figure 19:
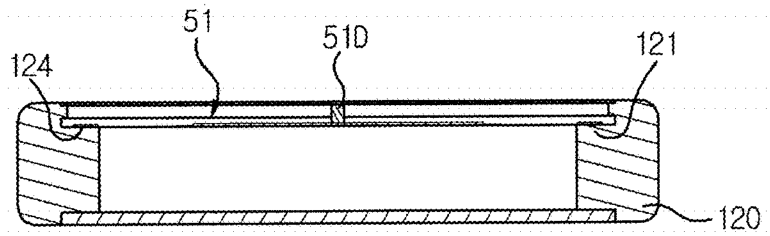
FIG. 19 is a front sectional view showing arrangement of a first vibrator.

FIG. 18 is a side sectional view showing a second vibrator disposed on the haptic display apparatus of FIG. 17, and FIG. 19 is a front sectional view showing arrangement of a first vibrator.

The haptic display apparatus 100 includes a housing 120 that defines an external appearance and receives the vibrators therein, and a display part 110 that is disposed in an opening formed through a top of the housing 120 and transmits vibration through an upper surface thereof The display part 110 is connected at edges thereof to the upper surface of the housing 120, and vibrators 51, 52, 53 and 54 are connected to the lower surface of the housing 120.

The vibrators comprise PZT beam vibrators, and are disposed on the lower surfaces of the edges of the display part 110 in such a way as to be parallel to the edges. Each PZT beam vibrator is fastened at one end or both ends thereof to the housing 120. As described above, it is more preferable that each vibrator comprise the both-end support type of PZT beam vibrator.

Therefore, the PZT beam vibrators are disposed on the lower surfaces of the edges of the display part 110 in such a way as to be parallel thereto. Each PZT beam vibrator is coupled to be supported at both ends thereof by supports portions of the housing 120.

The support portions 121, 122, 123 and 124 mean stepped portions that are spaced apart from the lower surface of the display part 110 in a height direction and protrude inwards. Since there must be formed space for vibrating the beams in the height direction while supporting both ends of each of four vibrators, it is preferable that the support portions be disposed around only the lower surfaces of the corners of the display part 110.

To be more specific, the support portions include a first support portion 121, a second support portion 122, a third support portion 123, and a fourth support portion 124. The first support portion 121 is provided on a lower surface of a corner at which the first and fourth edges 111 and 114 of the display part 110 meet, in such a way as to extend from the housing 120. The second support portion 122 is provided on a corner between the first edge 111 and the second edge 112. The third support portion 123 is provided on a corner between the second edge 112 and the third edge 113. The fourth support portion 124 is provided on a corner between the third edge 113 and the fourth edge 114.

Thus, the first vibrator 51 is supported at lower surfaces of both ends thereof by upper surfaces of the first and second support portions 121 and 122, and the remaining vibrators may be supported in a similar manner.

The area of each support portion and length of the support portion in a direction parallel to each edge may be selected, in consideration of a portion of each PZT beam vibrator that is to be supported.

Meanwhile, since the beams of the vibrators must vibrate in a vertical direction, namely, in a height direction of the housing 120 to transmit a vibration force to the display part 110, the center of each beam having the largest displacement forms the vibrating point.

Thus, an upper spacing portion 102 is formed under the lower surface of the display part 110 in such a way as to be spaced apart from the beam of the vibrator by a predetermined distance. The spacing distance may be set in consideration of the displacement of the beam, and is sufficient unless the vibration of the vibrator is directly transmitted to the display part in regions other than the vibrating point.

As described above, in order to form the respective vibrating points 51A, 52A, 53A and 54A, the central portion of the PZT beam vibrator and the central portion of the edge are connected to each other by a connection member to transmit a vibration force.

The second vibrator 52 will be described with reference to FIG. 18. A second connection member 52D is interposed between the lower surface of the second edge 112 of the display part 110 and the upper surface of the second vibrator 52. The second connection member 52D transmits vertical vibration of the beam 52B generated by the piezoelectric actuator 52C to the second edge 112 of the display part 110. The arrangement of the first vibrator 51, the third vibrator 53 and the fourth vibrator 54, and the relation with the connection member remain the same as described with reference to the second vibrator 52.

According to the present invention, the PZT beam vibrator is disposed on the edge of the display, and vibration is transmitted to the display part only at the vibrating point. That is, since the vibration generated by the vibrator beam is transmitted only by the connection member disposed on the upper spacing portion 102, such a configuration is advantageous to efficiently transmit and precisely control vibration.

In the haptic display apparatus, when vibration is transmitted to the housing, it may be difficult to provide a precise vibration sense. Hence, it is preferable to maximally suppress the transmission of vibration to the housing.

Thus, a side spacing portion 101 is formed between a side of the vibrator and an inner wall of the housing. Thereby, the vibrators are supported by the support portions 121, 122, 123 and 124 formed as the stepped portions, are spaced apart from an inner surface of the housing by a predetermined interval, and are disposed under the lower surface of the display part 110 in such a way as to be spaced apart therefrom.

That is, the vibrators are disposed on lower surfaces of the edges of the display part 110, and are adjacent to the inner wall of the housing 120 but are spaced apart therefrom by a predetermined interval.

As such, the upper spacing portion 102 and the side spacing portion 101 prevent vibration from being undesirably transmitted from the vibrators to the display part 110 and the housing 120, thus maximizing control efficiency of the vibration.

Figure 20:
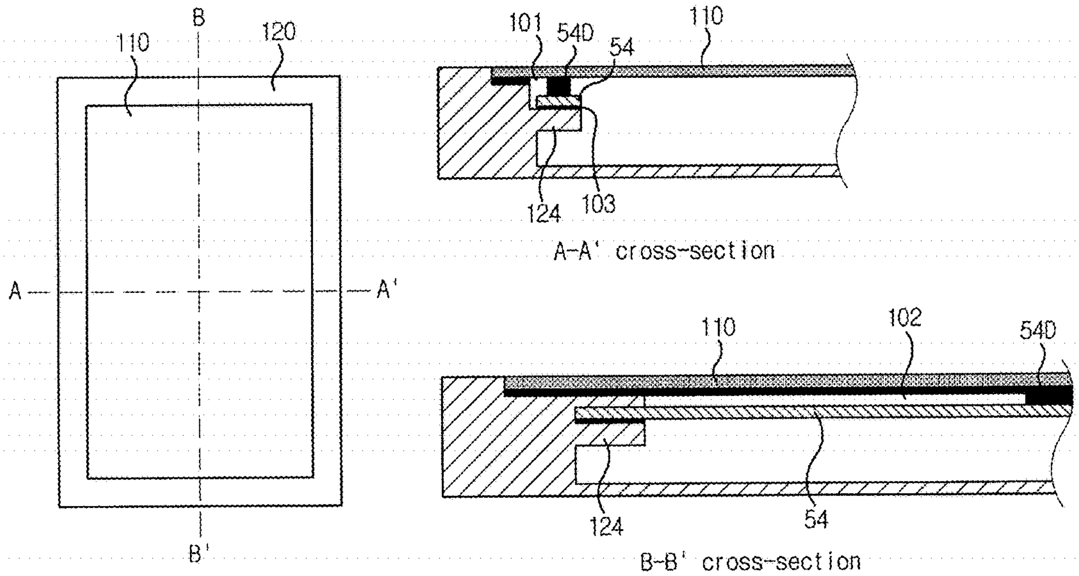
FIG. 20 is a detailed view showing a vibration isolating structure of the haptic display apparatus.

FIG. 20 is a detailed view showing a vibration isolating structure of the haptic display apparatus. A left-hand side view is a plan view of the haptic display apparatus, an upper right-hand side view is a front sectional view taken along line A-A', and a lower right-hand side view is a right side sectional view taken along line B-B'.

FIG. 20 illustrates the fourth vibrator 54. As described above, the side spacing portion 101 is formed between a side of the fourth vibrator 54 and an inner surface of the housing 120, and the upper spacing portion 102 is also formed between an upper surface of the fourth vibrator and the lower surface of the display part 110 to precisely transmit a vertical vibration force.

Such a spacing structure is advantageous in that transmission of vibration between the vibrator and the display part is performed only by the connection member connected to the central portion of the vibrator, thus considerably suppressing the undesirable transmission of vibration.

However, vibration may also be transmitted to a contact portion between the support portion formed in the housing and the vibrator. This vibration is transmitted to the housing and the display part, thus hindering vibration from being precisely controlled.

Thus, when viewed with reference to the fourth vibrator 40, it is preferable that an isolating material 103 be further provided between a lower surface of an end of the fourth vibrator 40 and a portion facing the fourth support portion 124.

The isolating material 103 may comprise an elastic material such as rubber, or comprise a material, such as silicone or adhesive, which is applied to absorb shocks by its own elastic force while performing direct bonding. Preferably, the isolating material 103 takes a shape of a double-sided adhesive film.

Figure 21:
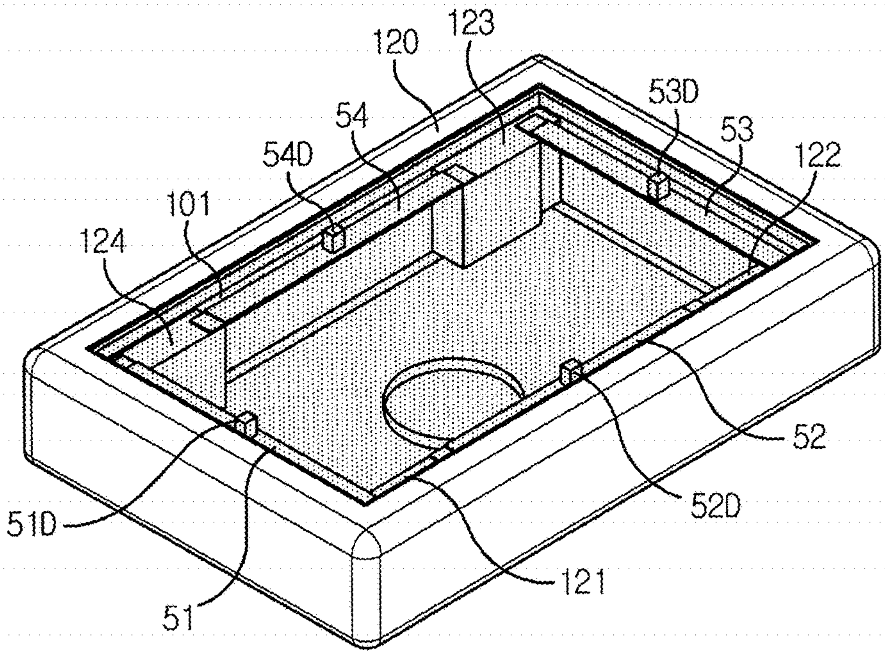
FIG. 21 is a perspective view showing a haptic display apparatus having the vibration isolating structure.

FIG. 21 is a perspective view showing the haptic display apparatus having the vibration isolating structure.

As described above, the side spacing portion 101 is formed between the side of each vibrator 51, 52, 53, 54 and the inner wall of the housing 120, and the upper spacing portion 102 is formed between the upper surface of the vibrator and the lower surface of the display part 110, thus preventing undesirable vibration from being directly transmitted from the vibrators to the housing and the display part. Thus, the transmission of the vibration to the display part can be performed only by the connection members 51D, 52D, 53D and 54D.

Further, the lower surfaces of both ends of the vibrator are supported on the upper surfaces of the support portions 121, 122, 123 and 124, and the isolating material 103 is interposed between the lower surfaces of both ends of the vibrator and the upper surface of the corresponding support portion, thus isolating vibration.

According to the preferred embodiment of the present invention, both ends of the PZT beam vibrator are supported by the support portion. However, one-end support type of vibrator may be used In this case, one end of the vibrator may be supported by the support portion of the housing, while the other end may be connected through the connection member to the lower surface of the display part.

Further, an example wherein the lower surfaces of both ends of the vibrator are in contact with or bonded to the upper surface of the support portion has been described. However, a predetermined groove may be formed in the support portion to support the upper and lower surfaces of the vibrator. In this case, the isolating material may be uniformly applied to a contact surface.

Meanwhile, as described above, according to the concept of adjusting the vibrating position of the display part through a plurality of vibrating points while having the vibration isolating structure, it is preferable that the vibrators have output of the same frequency and amplitude. Therefore, the vibrators comprise vibration beams having the same mechanical performance and the same length.

Here, if the display part 110 has a rectangular shape, a vertical length thereof is larger than a lateral length thereof. The arrangement of the first and third vibrators 51 and 53 using the support portions is different from that of the second and fourth vibrators 52 and 54 using the support portions, which will be described below.

Figure 22:
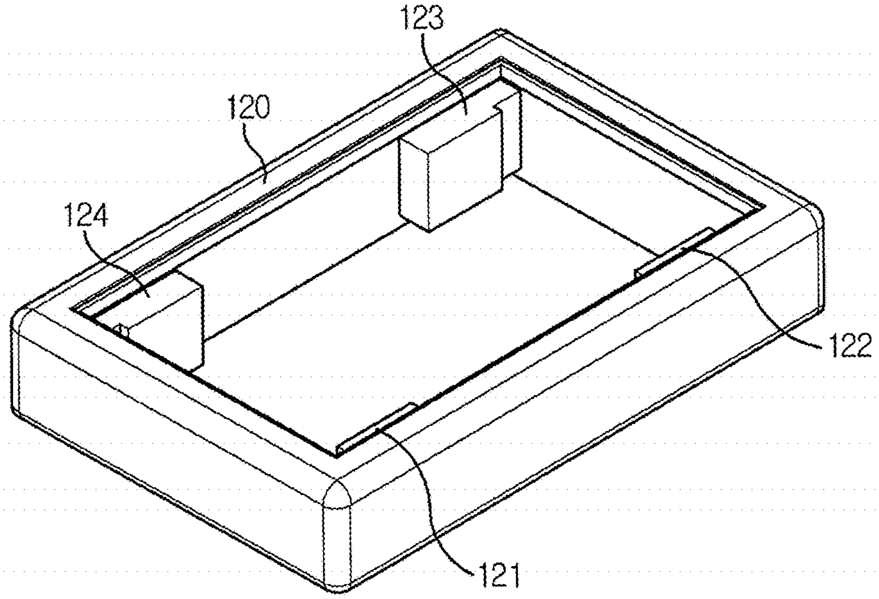
FIG. 22 is a perspective view showing a housing of the haptic display apparatus in accordance with the present invention.

FIG. 22 is a perspective view showing the housing of the haptic display apparatus according to the present invention.

As described above, the housing 120 supports the display part 110 at an upper position, and supports the vibrators 51, 52, 53, and 54 therein. The housing 120 is provided with the support portion as the vibrator support structure.

Each support portion having a predetermined lateral length and a predetermined vertical length is formed on the corner of the inner wall of the housing 120. The upper surface of the support portion is spaced apart from the lower surface of the display part by a predetermined interval.

As shown in FIG. 22, when the display part and the housing take a rectangular shape that is long in vertical length and the vibrators have the same shape, the support portions are different from each other in lateral and vertical lengths. That is, each support portion is long in vertical length and is short in lateral length.

The vertical length and lateral length of each support portion depend on length of the vibrator beam. Thus, the spacing distance between the first and second support portions 121 and 122 is equal to the spacing distance between the first and fourth support portions 121 and 124. Similarly, the distance between the second and third support portions 122 and 123 and the distance between the third and fourth support portions 123 and 124 depend on the length of the vibrator beam, more precisely, the length of the beam vibrating vertically in the spacing space between the support portions.

Meanwhile, the portions for supporting the first and third vibrators 10 and 30, namely, the vibrators arranged in the lateral direction may be stepped to be recessed towards the inner wall of the housing, in consideration of the spatial arrangement.

As described above, when the vibrating point is formed on each edge of the display part to be vibrated by the PZT beam vibrator and the excitation frequency is adjusted within the domain less than the primary resonant frequency, vibration may occur at a desired position of the display part, the vibrating position may be adjusted, and besides multiple vibrations may occur in two or more portions.

In order to achieve precise vibration, the spacing portions are formed between each vibrator and the housing, and between each vibrator and the display part. Further, the isolating material is provided on a contact portion between each vibrator and the corresponding support portion of the housing. Thereby, the vibration isolating structure for suppressing the undesirable transmission of vibration is realized.

Therefore, unlike the prior art, the haptic display apparatus having the vibration isolating structure according to the present invention is advantageous in that vibration can be generated at or moved to a desired position throughout the whole area of the display part, thus maximizing a user's convenience and effectively generating various outputs.

According to the embodiment of the present invention, each vibrator is arranged so that an excitation positions is set at the center of each edge. However, in order to more precisely control the vibrating position, two or more vibrators may be provided on each edge, and besides the vibrating point may be formed at a position adjacent to the central portion rather than the edge.

Herein, the rectangular display part has been described as one example. However, as described above, the haptic display apparatus or display part may have various shapes as necessary, may locate the vibrators at proper positions, and may control the vibrating position by a change in frequency of the individual vibrator and interaction between the vibrators. Further, it should be understood that panels providing only tactility without displaying images as well as panels displaying various kinds of images fall within the purview of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A haptic display apparatus having a vibration isolating structure, the apparatus comprising:

a display;

a housing configured to support the display;

a plurality of supports each protruded from an inner side surface of the housing, wherein each of the supports faces each other and is disposed under a corner of the display; and a plurality of vibrators each spaced apart from the inner side surface of the housing to form a first spacing portion and configured to vibrate a predetermined portion of the display, wherein each of the vibrators has a long rectangular shape, wherein both distal ends of each vibrator are disposed on the supports and supported by the supports, wherein an upper surface of each of the vibrators is spaced apart from a lower surface of the display to form a second spacing portion by a connection member, and wherein each of the vibrators is connected to the display at a middle portion thereof through the connection member, such that the first and the second spacing portions inhibit vibration from the vibrators from being transmitted to the display and the housing.

2. The apparatus of claim 1, wherein a center of each of the vibrators is connected to an edge of the display.

3. The apparatus of claim 1, wherein the connection member is configured to connect a lower surface of the display to an upper surface of at least one of the vibrators.

4. The apparatus of claim 1, wherein a side of each of the vibrators is spaced apart from the inner surface wall of the housing.

5. The apparatus of claim 1, further comprising:

an isolating material provided on a contact portion between at least one of the supports and an end of at least one of the vibrators.

6. The apparatus of claim 1, wherein each of the vibrators has the same length.

7. The apparatus of claim 1, wherein the display has a rectangular shape, and wherein each of the vibrators is positioned at each of the edges of the display, respectively.

8. The apparatus of claim 7, wherein the connection member is disposed in a space between the display and the respective vibrator.

9. The apparatus of claim 1, wherein the display further includes a panel on which each of the plurality of vibrators is disposed parallel to an edge of the panel and is connected at a center of the panel.

10. The apparatus of claim 9, wherein a vibration center is located at a center of the panel when a vibration frequency equals a primary resonant frequency.

11. The apparatus of claim 10, wherein the panel has a shape of a rectangular flat plate, and each vibrator is further configured to transmit vibration to a center of each edge of the panel.

12. The apparatus of claim 9, wherein each vibrator comprises a piezoelectric actuator.

13. The apparatus of claim 9, wherein each vibrator comprises a bimorph-type piezoelectric actuator and both ends of a vibration beam of the bimorph-type piezoelectric actuator are supported.

14. The apparatus of claim 13, wherein the vibration beam is parallelly disposed on a lower surface of each of the edges of the panel, and a central portion of the vibration beam is connected to a center of each of the edges.

15. The apparatus of claim 10, wherein a signal applied to the vibrators includes a signal with a triangle wave and whose vibration frequency is less than the primary resonant frequency of the display.

16. The apparatus of claim 15, wherein the triangle wave has a prescribed symmetry ratio.

* * * * *